March 15, 1927.
L. K. SNELL
1,620,924
COUPLING FOR PIPES
Filed Oct. 25, 1920
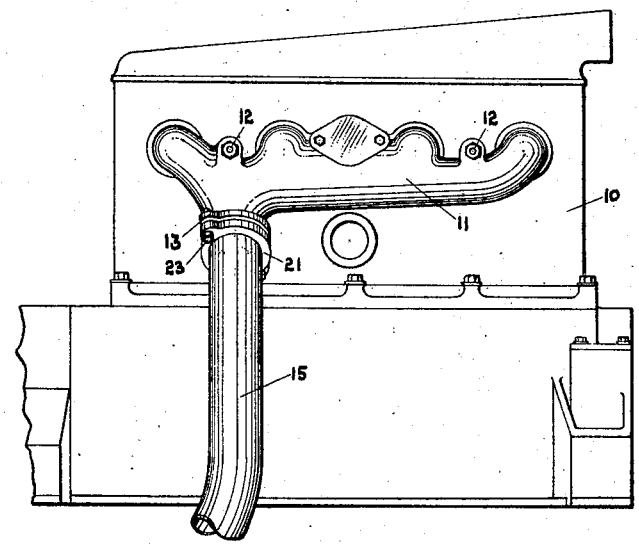
Fig. I.
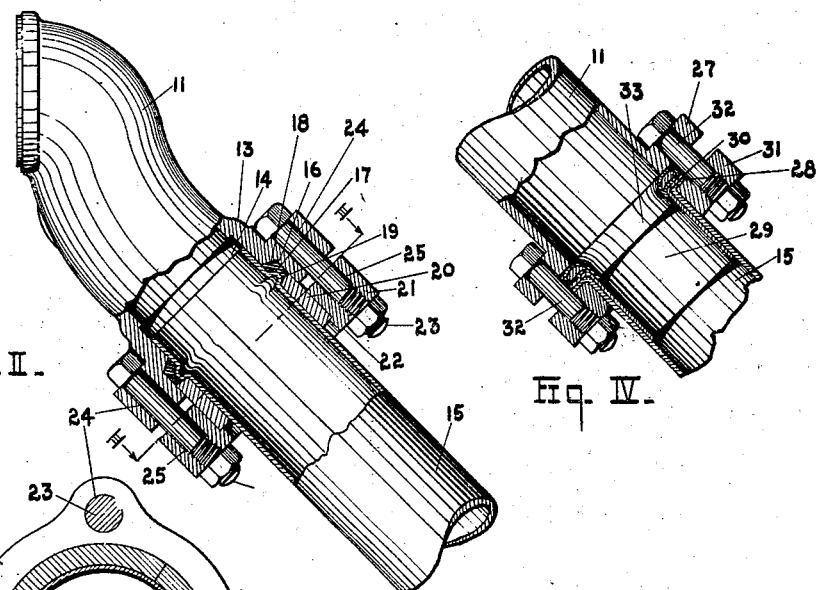
Fig. II.
Fig. IV.
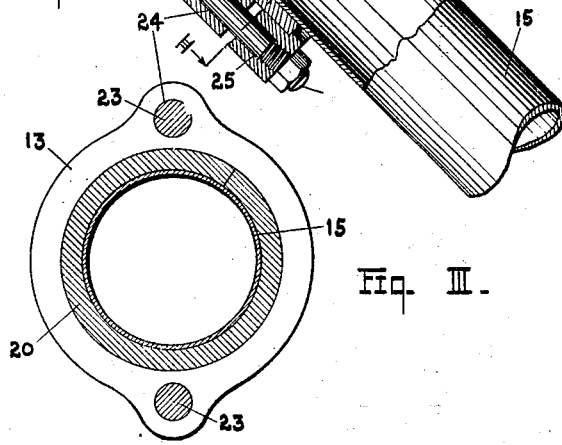
Fig. III.
INVENTOR.
Lyle K. Snell
BY Chester W. Braselton
Harry W. Lindsay
ATTORNEYS.

Patented Mar. 15, 1927.

1,620,924

UNITED STATES PATENT OFFICE.

LYLE K. SNELL, OF TOLEDO, OHIO, ASSIGNOR TO THE WILLYS-OVERLAND COMPANY, OF TOLEDO, OHIO, A CORPORATION OF OHIO.

COUPLING FOR PIPES.

Application filed October 25, 1920. Serial No. 419,329.

This invention relates to couplings for pipes and particularly to couplings for connecting the exhaust manifold with the exhaust pipe.

One object of my invention is to provide a coupling for connecting an exhaust pipe to an exhaust manifold in such a manner that the same may be readily disconnected.

Another object of my invention is to provide a means for joining pipes whereby the parts may be readily disassembled and new packing inserted.

Another object of my invention is to provide a split collar on one of the pipes which co-acts with an enlargement on the other pipe to hold the packing in place and form a tight joint.

Other objects, and objects relating to details of construction and economies in manufacture will appear as I proceed with the description of that embodiment of the invention which for the purposes of the present application I have illustrated in the accompanying drawing, in which:

Figure I is a side elevational view of an engine showing the exhaust manifold connected to the exhaust pipe by my improved coupling.

Figure II is a detailed fragmentary view, certain parts being broken away to more clearly show my invention.

Figure III is a transverse sectional view taken on the line III—III of Figure II.

Figure IV is a view similar to Figure II showing a slightly modified form of my invention.

In the drawing, similar reference numerals refer to similar parts throughout the several views and the sectional view is taken looking in the direction of the arrows at the end of the section line.

While it will be understood that my invention will find utility as a coupling for pipes of any character, it is particularly adapted for connecting an exhaust manifold with the exhaust pipe. In previous constructions it has been found necessary to weld or secure a member to the exhaust pipe, this member having a flange or other means for connecting the same with the exhaust manifold. With this previous construction it has been found hard to disassemble the part for repair or replacement of the packing. In my present invention I have shown a coupling which enables the use of an asbestos rope or other packing if desired, and this has been found desirable because of the fact that the operator can make any necessary changes or replacements of parts with the use of ordinary tools, to disassemble the coupling and make necessary repairs.

Referring to the drawing, 10 represents an internal combustion engine having an exhaust manifold 11 connected thereto by means of bolts 12. The exhaust manifold 11 is provided with an enlargement 13 at its lower end, having a recess 14 therein to receive the upper end of an exhaust pipe 15. The enlargement 13 on the lower end of the exhaust manifold 11 is also provided with an annular recess or counterbore 16 to receive the packing 17 which is adapted to be compressed between the shoulder 18 on the enlargement 13 and a rib 19 adjacent the outer end of the exhaust pipe 15. A split collar 20 is mounted on the outer periphery of the exhaust pipe 15 and is adapted to abut against the rib 19 on the exhaust pipe 15 to press the packing 17 into the desired shape and seal the joint between the exhaust manifold 11 and the exhaust pipe 15. A ring 21 having a shoulder 22 at its lower end is mounted on the exhaust pipe 15, the shoulder 22 being adapted to contact with the split collar 20 to draw the same into position. The ring 21 is held in this position by means of bolts 23 extending through openings 24 in the enlargement 13 of the exhaust manifold 11 and openings 25 in the ring 21.

In the assembly of the coupling it will be seen that the inner periphery of the ring 21 is of sufficient size to be slipped over the rib 19 on the exhaust pipe 15. After the ring 21 has been inserted on the pipe 15 the split collar 20 is inserted on the pipe 15 and placed in position to abut against the rib 19. The packing 17 which may be of any suitable material is then inserted in the recess or counterbore 16 of the enlargement 13 and the exhaust manifold 11 and the outer end of the exhaust pipe 15 is then inserted in the recess 14 formed in the enlargement 13 at the lower end of the manifold 11. After this operation the bolts 23 are inserted in the openings in the enlargement 13 and the ring 21 and the nuts tightened into position to draw the parts in clamped position.

In Figure IV I have shown a slightly modified form of my invention in which the exhaust manifold 11 is provided at its lower end with a flange 27 and the exhaust pipe 15 has its outer end bent out or flanged at 28. A cup-shaped member 29 is inserted in the outer end of the exhaust pipe 15 to reinforce the latter and has a flange 30 abutting the flange 28 of the exhaust pipe 15. A collar or ring 31 is mounted on the exhaust pipe 15 and has openings extending therethrough to receive bolts 32. Interposed between the flange 27 of the exhaust manifold 11 and the flange 28 is a gasket or packing 33. When the nuts are tightened on the bolts 32 the gasket or packing 33 will be compressed to take the form shown in Figure IV and a tight joint is secured between the exhaust manifold 11 and the exhaust pipe 15.

While I have shown and described in considerable detail a specific embodiment of my invention, it is to be understood that this showing and description is illustrative only and for the purpose of rendering my invention more clear and that I do not regard the invention as limited to the details of construction illustrated or described or any of them except in so far as I have included such limitations within the terms of the following claims, in which it is my intention to claim all novelty inherent in my invention broadly as well as specifically.

Having thus described my invention what I claim as new and desire to secure by Letters Patent is:

1. In a device of the class described, a pipe having a counterbore at one end thereof, a second pipe of substantially uniform diameter telescoping within said first pipe and having a bearing therewith beyond said counterbore, an annular rib formed on said second pipe and spaced from the end thereof, a packing ring fitting in said counterbore and adapted to be engaged by said rib when said pipes are drawn together and means including a holding ring slidably mounted on said second pipe engaging said rib and fitting in said counterbore for drawing said pipes together and radially supporting said second pipe within the counterbore, said holding ring being slipped longitudinally upon the second pipe past said annular rib.

2. In a device of the class described, a pipe having a counterbore and an enlargement at one end thereof, a second pipe of substantially uniform diameter fitting within and having a bearing with said first pipe beyond said counterbore, an annular rib formed on said second pipe and spaced from the end thereof, a packing ring fitting in said counterbore and adapted to be engaged by said rib when said pipes are drawn together, a ring slidably mounted within said counterbore and surrounding said second pipe and engaging said rib, a second ring on said second pipe engaging said first ring, both of said rings being mounted upon the second pipe by moving them longitudinally thereof past said annular rib, and a plurality of longitudinally extending bolts connecting said second ring and said enlargement for drawing said pipes together to compress said packing.

In testimony whereof, I affix my signature.

LYLE K. SNELL.